US012121166B1

(12) United States Patent
Zhuang et al.

(10) Patent No.: US 12,121,166 B1
(45) Date of Patent: Oct. 22, 2024

(54) DIGITAL PHOTO FRAME

(71) Applicant: SHENZHEN ELECTRON TECHNOLOGY CO., LTD., Shenzhen (CN)

(72) Inventors: Cheng Zhuang, Shenzhen (CN); Yonghong Li, Shenzhen (CN)

(73) Assignee: SHENZHEN ELECTRON TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/629,866

(22) Filed: Apr. 8, 2024

(30) Foreign Application Priority Data

Jan. 8, 2024 (CN) .......................... 202420047856.3
Jan. 8, 2024 (CN) .......................... 202420055114.5
Jan. 8, 2024 (CN) .......................... 202420056798.0
Jan. 8, 2024 (CN) .......................... 202420059225.3

(51) Int. Cl.
*A47G 1/06* (2006.01)
*G09G 3/20* (2006.01)
*H05B 45/10* (2020.01)
*H05B 45/20* (2020.01)

(52) U.S. Cl.
CPC ............. *A47G 1/0627* (2013.01); *G09G 3/20* (2013.01); *H05B 45/10* (2020.01); *H05B 45/20* (2020.01); *G09G 2380/16* (2013.01)

(58) Field of Classification Search
CPC .... A47G 1/0627; G09G 2380/16; G09G 3/20; H05B 45/20; H05B 45/10
See application file for complete search history.

(56) References Cited

U.S. PATENT DOCUMENTS

| 10,142,592 | B1 * | 11/2018 | Van Ness | ............... H04N 7/147 |
| 2006/0285358 | A1 * | 12/2006 | Chen | ...................... G09F 13/04 |
| | | | | 362/613 |
| 2011/0157841 | A1 * | 6/2011 | Sun | ........................ H01R 12/55 |
| | | | | 361/748 |
| 2014/0223787 | A1 * | 8/2014 | Richmond | .............. G09F 13/04 |
| | | | | 40/575 |

* cited by examiner

*Primary Examiner* — Gary C Hoge
(74) *Attorney, Agent, or Firm* — Ying-Ting Chen

(57) ABSTRACT

A digital photo frame, comprising a display monitor (10), a frame body (20), and a back cover (30), wherein the display monitor (10) is arranged at the front surface of the frame body (20), and the back cover (30) is arranged at the rear surface of the frame body (20), wherein the digital photo frame also comprises an ambient light strip (40), wherein the ambient light strip (40) is disposed around the frame body (20), and corresponding to the ambient light strip (40), a translucent cover strip (50) is arranged on the frame body (20), and correspondingly the light emitted by the ambient light strip (40) is projected outward through the translucent strip (50).

15 Claims, 8 Drawing Sheets

DIGITAL PHOTO FRAME

BACKGROUND OF THE PRESENT INVENTION

Field of Invention

The present invention related to a digital photo frame, and more particularly to a digital photo frame that comprises an ambient light strip and a tilted support stand.

Description of Related Arts

A digital photo frame, abbreviated as DPF, has now been widely used by people. A digital photo frame is an electronic device for displaying digital photos, and is exclusively designed for viewing and sharing digital images.

As shown in FIG. 1, a traditional digital photo frame typically comprises a frame body (1). The frame body (1) is provided with a display monitor (2). Digital photos or other contents to be displayed are saved within the digital photo frame. While in use, the display monitor (2) is electrically powered to emit light to display the contents saved within the digital photo frame.

There are still many limitations to the operation of a traditional digital photo frame, which are now described as below.

Firstly, the overall configuration of a traditional digital photo frame is similar to the configuration of a tablet. Since the digital photo frame is not provided with any lighting rendering setting, the aesthetic effect thereof is limited when placed on a display stand for exhibition.

Secondly, a traditional digital photo frame is usually used either in handheld manner or in fixed support manner, wherein the handheld manner refers to a user supporting the digital photo frame using either one hand or both hands while in use, which the usage manner is similar to a tablet. The fixed support manner refers to using a frame stand (3) to support the digital photo frame at a specific location for exhibition, such as supporting on a table surface or a display shelf for use.

As shown in FIGS. 2 to 3, in practice, the frame stand (3) can be either an integrated bracket or a split bracket, wherein the integrated bracket refers to the frame stand (3) being directly connected to the frame body (1), and while in use, the frame body (3) supports the digital photo frame at a specific location for exhibition. The advantage is that users can use it either in handheld manner or fixed support manner, while the disadvantage is that the frame stand (3) connecting onto the frame body (1) forms a complete body that complicates the structure of the digital photo frame. Additionally, during the handheld manner, the frame stand (3) will affect the positioning of the handgrip.

The split bracket refers to the frame stand (3) being placed independently at a specific location, and the digital photo frame can be used in hand or mounted to the frame stand (3). The advantage is convenient to use and is unnecessary for extra structure for the digital photo frame, while the disadvantage is that the frame stand (3) can be easily lost or misplaced.

Lastly, the internal of a traditional digital photo frame is provided with a battery for supplying electrical power, wherein the disadvantage is that the storage capacity of the battery is limited to provide electric power sustainably. Additionally, external charging cables are required for recharging batteries, which will reduce the aesthetic appearance during the charging process. As described above, those are the main disadvantages of a traditional digital photo frame.

SUMMARY OF THE PRESENT INVENTION

The present invention provides a digital photo frame, comprising a display monitor (10), a frame body (20), and a back cover (30), wherein said display monitor (10) is arranged at the front surface of said frame body (20), and said back cover (30) is arranged at the rear surface of said frame body (20), wherein said digital photo frame also comprises an ambient light strip (40), wherein said ambient light strip (40) is disposed around said frame body (20), and corresponding to said ambient light strip (40), a translucent cover strip (50) is arranged on said frame body (20), and correspondingly the light emitted by said ambient light strip (40) is projected outward through said translucent strip (50).

The invention is advantageous in that it provides a digital photo frame, wherein while the digital photo frame is in use, the ambient light strip is able to be electrically powered to emit light, forming a decorative lighting effect surrounding the digital photo frame, thus enhancing the lighting rendering effect of the digital photo frame.

Another advantage of the invention is to provide a digital photo frame, wherein the tilted support stand of the digital photo frame is actively connected to the back cover, allowing the tilted support stand of the digital photo frame to be detachable.

Another advantage of the invention is to provide a digital photo frame, wherein the digital photo frame comprises of a base support manner and a side support manner, thus offering two unique application methods for the convenience of users.

Another advantage of the invention is to provide a digital photo frame, wherein the digital photo frame comprises an external battery, wherein the external battery can be detachably connected to the tilted support stand, and the external battery can expand the power reserve of the digital photo frame.

DETAILED DESCRIPTION OF THE PREFERRED EMBODIMENT

As shown in FIGS. 4 to 14, a digital photo frame, comprising a display monitor (10), a frame body (20), and a back cover (30), wherein the display monitor (10) is arranged at the front surface of the frame body (20), and the back cover (30) is arranged at the rear surface of the frame body (20).

Figure 1:
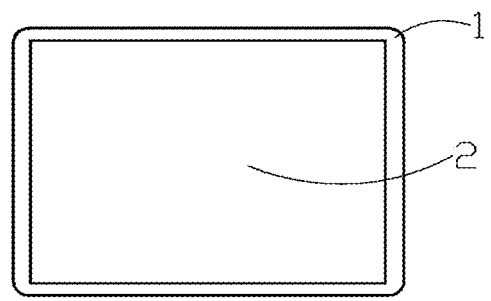
FIG. 1 is a schematic view of a traditional digital photo frame.
Figure 2:
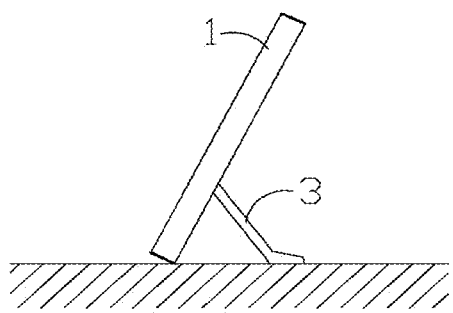
FIG. 2 is a perspective view of the integrated bracket of a traditional digital photo frame.
Figure 3:
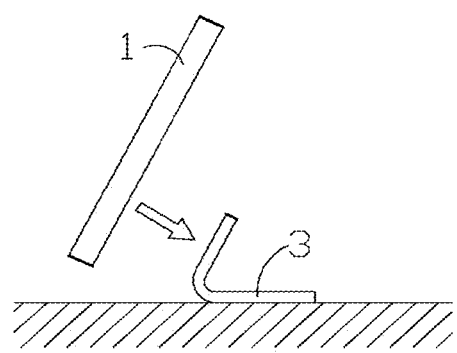
FIG. 3 is a perspective view of a split bracket of a traditional digital photo frame.
Figure 4:
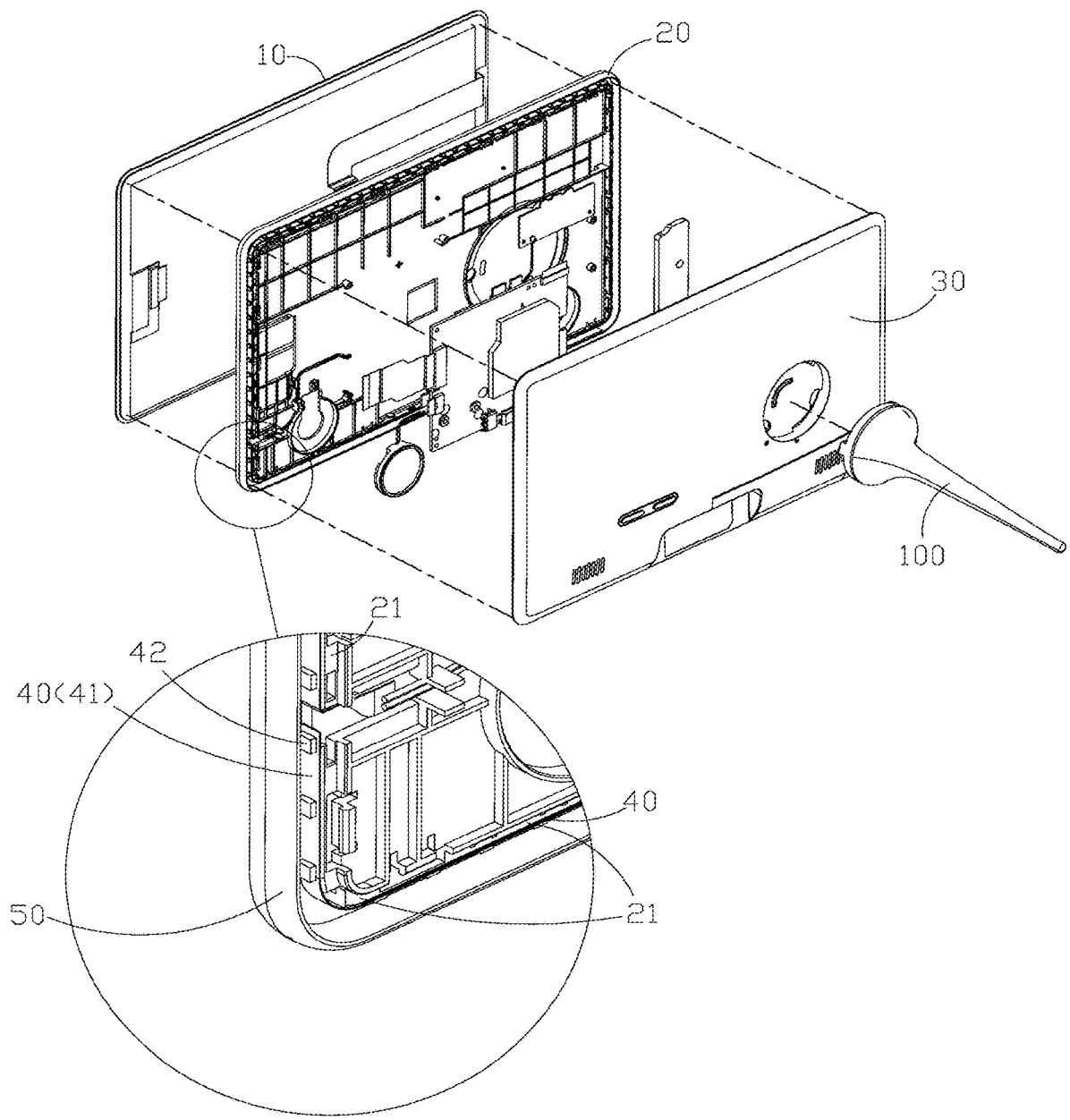
FIG. 4 is a three-dimensional exploded view of the present invention.
Figure 5:
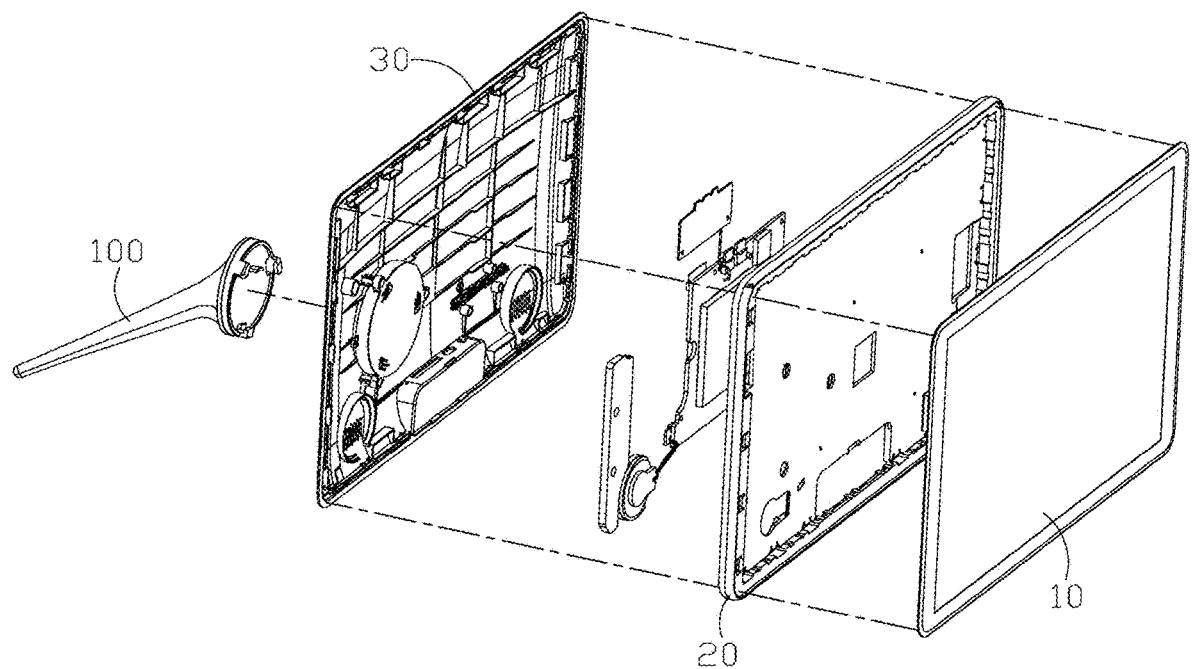
FIG. 5 is a three-dimensional exploded view of another aspect of the present invention.

As shown in FIG. 4, the digital photo frame also comprises an ambient light strip (40), wherein the ambient light strip (40) is disposed around the frame body (20), and corresponding to the ambient light strip (40), a translucent cover strip (50) is arranged on the frame body (20). The light emitted by the ambient light strip (40) is projected outward through the translucent strip (50), so that the light emitted by the ambient light strip (40) forms a lighting rendering area surrounding the digital photo frame. The color and the light intensity of the light emitted by the ambient light strip (40) can be changed according to the content displayed by the digital photo frame. For example, when the content displayed by the digital photo frame is either a video or an image of a grass field, the ambient light strip emits a green light of a brighter hue.

The translucent cover strip (50) has the functionality of providing a uniform illumination. As to the present invention, in practice, the ambient light strip (40) is electrically powered to emit light, wherein the light emitted by the ambient light strip (40) is projected outward through the translucent cover strip (50), forming a decorative lighting effect surrounding the digital photo frame, thus further enhancing the lighting rendering effect of the digital photo frame. In practice, the ambient light strip (40) can emit a flashing light, which the color of the emitted light can be changed, thus further enhancing the lighting rendering effect of the digital photo frame.

In one embodiment, the ambient light strip (40) comprises a light strip body (41) and a plurality of LED light sources (42), wherein the plurality of LED light sources (42) are simultaneously and electrically connected to the light strip body (41). The translucent cover strip (50) acts as a light diffuser strip. The light emitted by the plurality of LED light sources (42) projects into the light diffuser strip, which the light diffuser strip converts the point light source formed by the plurality of LED light sources (42) into an area light source, thus enhancing the lighting rendering effect of the digital photo frame.

As shown in FIG. 4, in one embodiment, the back of the frame body (20) is protruded with a rib bracket (21). The ambient light strip (40) has an annular shape, and the ambient light strip (40) is entirely surrounding the rib bracket (21), while the back cover (30) is fastened to the translucent light strip (50).

Figure 6:
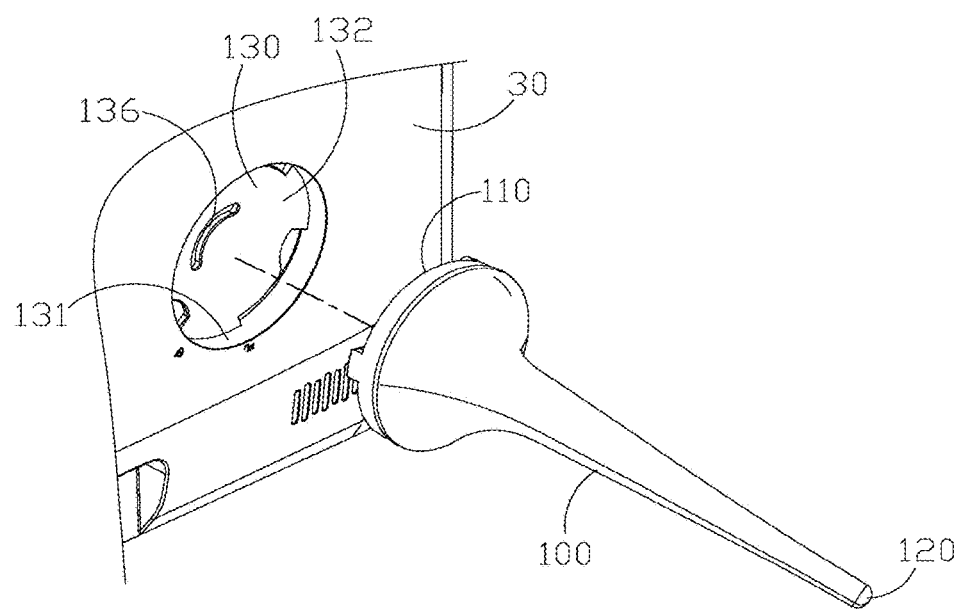
FIG. 6 is a perspective view of the movable end connection and the movable connecting part of the present invention.

As shown in FIG. 6, the digital photo frame also comprises a tilted support stand (100), wherein the tilted support stand (100) is actively connected to the back cover (30) The tilted support stand (100) comprises a movable connection end (110) and a support end (120). The top of the back cover (30) is provided with a movable connector (130), wherein the movable connector (130) and the movable connection end (110) correspond with each other. The movable connection end (110) is detachably connected to the movable connector (130), allowing the tilted support stand (100) to be detachably connected to the back cover (30).

Figure 7:
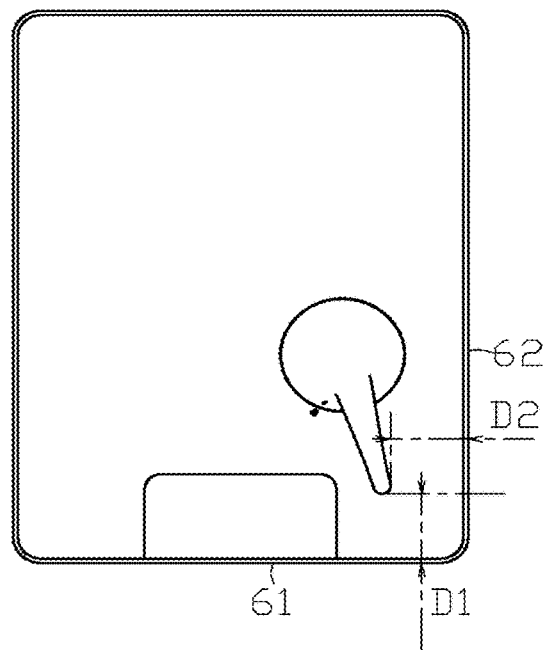
FIG. 7 is a perspective view of the base support distance and the side support distance of the present invention.

As shown in FIG. 7, the digital photo frame comprises a horizontal bottom edge (61) and a vertical side edge (62), wherein the horizontal bottom edge (61) is positioned at the bottom of the digital photo frame, and the vertical side edge (62) is positioned at one side of the digital photo frame. When the tilted support stand (100) is connected to the back cover (30), a base support distance (D1) is formed in between of the support end (120) of the tilted support stand (100) and the horizontal bottom edge (61), and a side support distance (D2) is formed in between of the support end (120) of the tilted support stand (100) and the vertical side edge (62), wherein the base support distance (D1) is equivalent to the side support distance (D2), D1=D2.

The digital photo frame is able to be arranged on a supporting surface using the tilted support stand (100), and the digital photo frame is able to be used in a base support manner and a side support manner.

Figure 8:
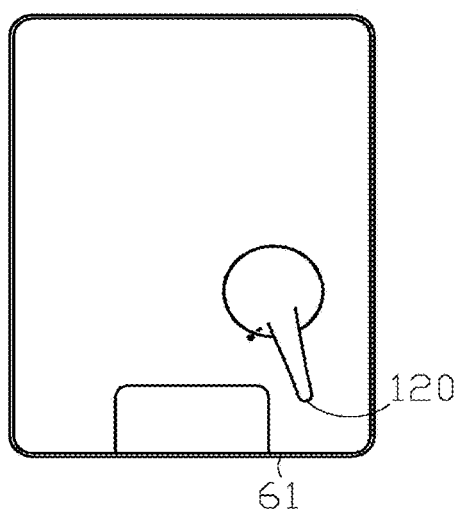
FIG. 8 is a perspective view of the base support manner of the present invention.

As shown in FIG. 8, when the digital photo frame is in the base support manner, the digital photo frame is arranged on the supporting surface using the tilted support stand (100), while the support end (120) and the horizontal bottom edge (61) are contacting with the supporting surface.

Figure 9:
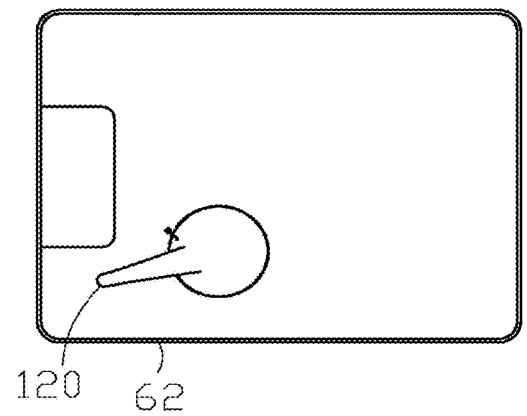
FIG. 9 is a perspective view of the side support manner of the present invention.

As shown in FIG. 9, when the digital photo frame is in the side support manner, the digital photo frame is arranged on the supporting surface using the tilted support stand (100), while the support end (120) and the vertical side edge (62) are contacting with the supporting surface.

In the present invention, the method of movably connecting the tilted support stand (100) to the back cover (30) results in the tilted support stand (100) to become detachable, wherein when the tilted support stand (100) is detached, the digital photo frame is able to be conveniently handheld by the user, and when the tilted support stand (100) is assembled on the back cover (30), the digital photo frame is able to be placed on a table surface for use, and the digital photo frame of the present invention is able to be used in a base support manner and a side support manner, in other words, the digital photo frame of the present invention is able to be horizontally placed on a table surface for use, and also is able to be vertically placed on a table surface for use, thus offering unique application methods for the convenience of the user.

In one embodiment, the movable connection end (110) and the support end (120) are respectively located at the two opposing ends of the tilted support stand (100), wherein the whole body of the tilted support stand (100) is the shape of a tilted cone.

Figure 10:
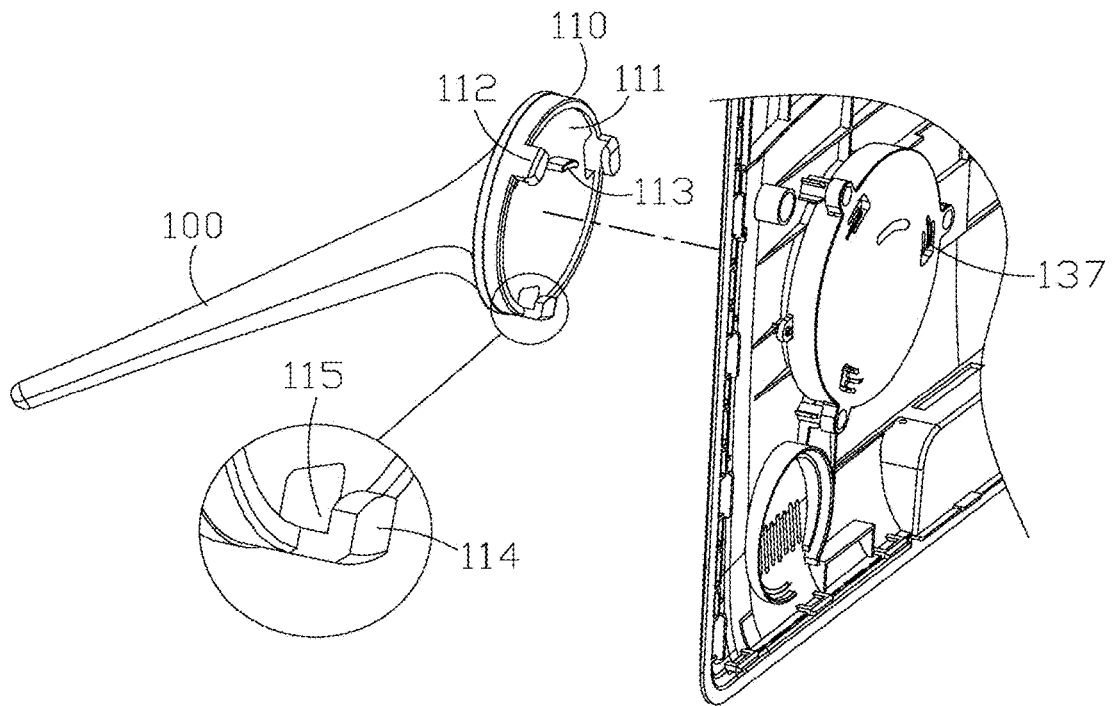
FIG. 10 is a three-dimensional perspective view of the movable end connection of the present invention.

As shown in FIG. 10, in one embodiment, the movable connection end (110) is detachably and rotatably disposed in the movable connector (130), and the end face (111) of the movable connection end (110) is provided with a plurality of locking joints (112) and a positioning piece (113), wherein the plurality of locking joints (112) are protruded around the end face (111). Each of the plurality of locking joints (112) is provided with a top plate (114) and a groove (115), wherein the groove (115) is located in between of the top plate (114) and the end face (111).

Figure 11:
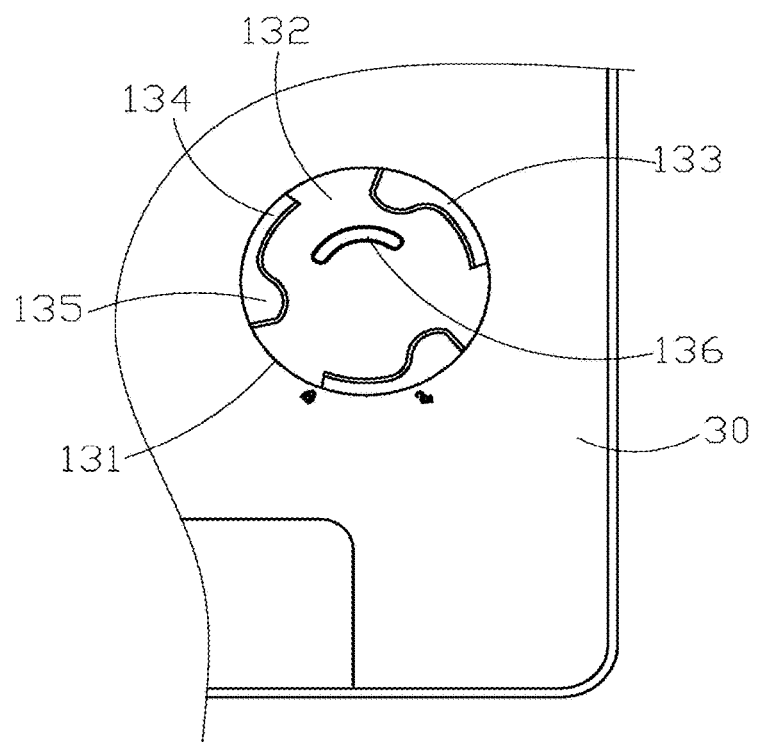
FIG. 11 is a front view of the movable connector of the present invention.

As shown in FIGS. 6, 10, and 11, the movable connector (130) comprises a concave wall (131) and a base plate (132), wherein the base plate (132) is connected to the concave wall (131). Corresponding to the locking joints (112), a plurality of locking plates (133) is provided on the concave wall (131), wherein each locking plate (133) corresponds to one locking joint (112). Each locking plate (133) comprises a guiding plate (134) and a limiting plate (135), wherein the limiting plate (135) is connected to the rear end of the guiding plate (134), and the guiding plate (134) and the limiting plate (135) of the locking joint (112) correspond to each other.

The base plate (132) is provided with a waist hole (136), wherein the waist hole (136) and the positioning piece (113) correspond with each other. A plurality of deformable segments (137) is also provided on the base plate (132), wherein each deformable segment (137) corresponds to one locking joint (112), and each deformable segment (137) is arranged on the position of the base plate (132) corresponding to the front of the guiding plate (134).

The movable connection end (110) is rotatably connected to the movable connector (130). Firstly, compress the front end of the movable connection end (110) to the movable connector (130), and insert the positioning piece (113) in the waist hole (136), thus accomplishing the initial positioning. Secondly, align the groove (115) of the locking joint (112) with the guiding plate (134). At this instance, adjust the spatial position of the groove (115) by using the top plate (114) to compress the deformable segment (137). Thirdly, rotate the tilted support stand (100) until each guiding plate (134) is fitted in the corresponding groove (115) to finalize the assembly.

Figure 12:
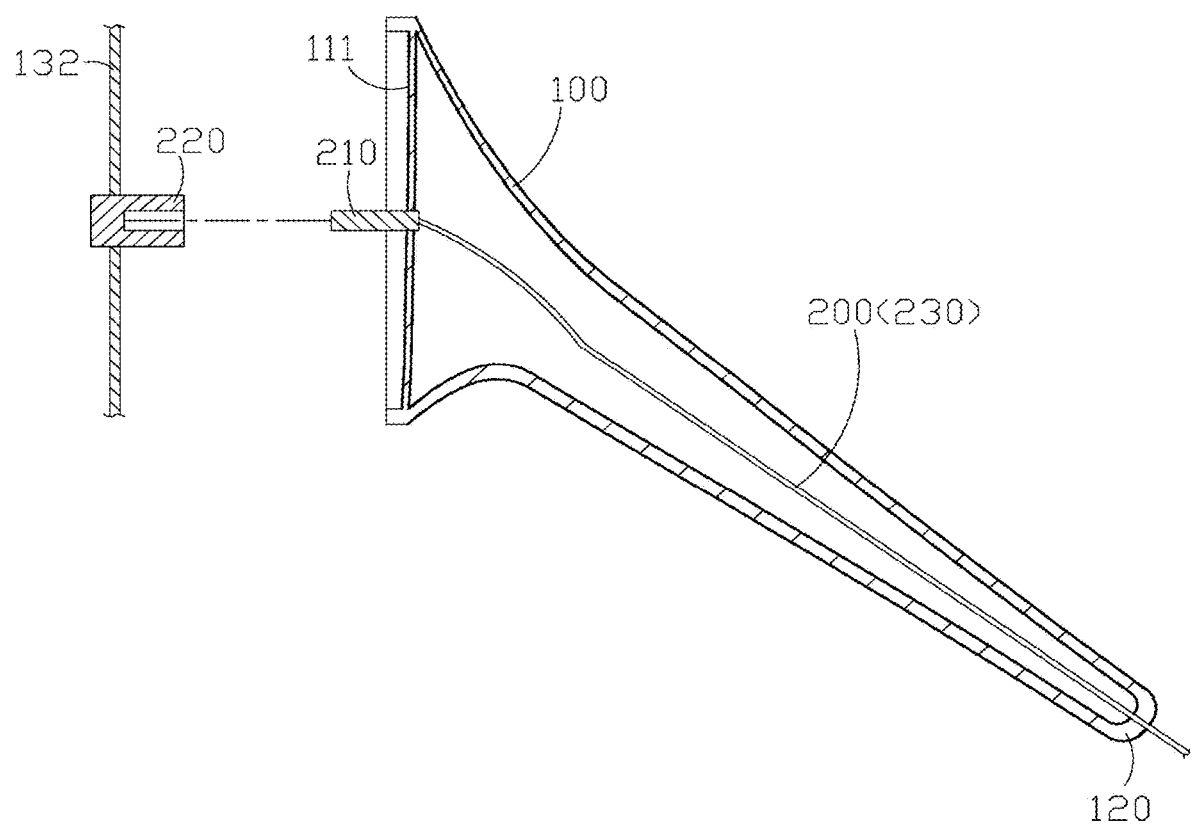
FIG. 12 is a perspective view of the power supply unit of the present invention.
Figure 13:
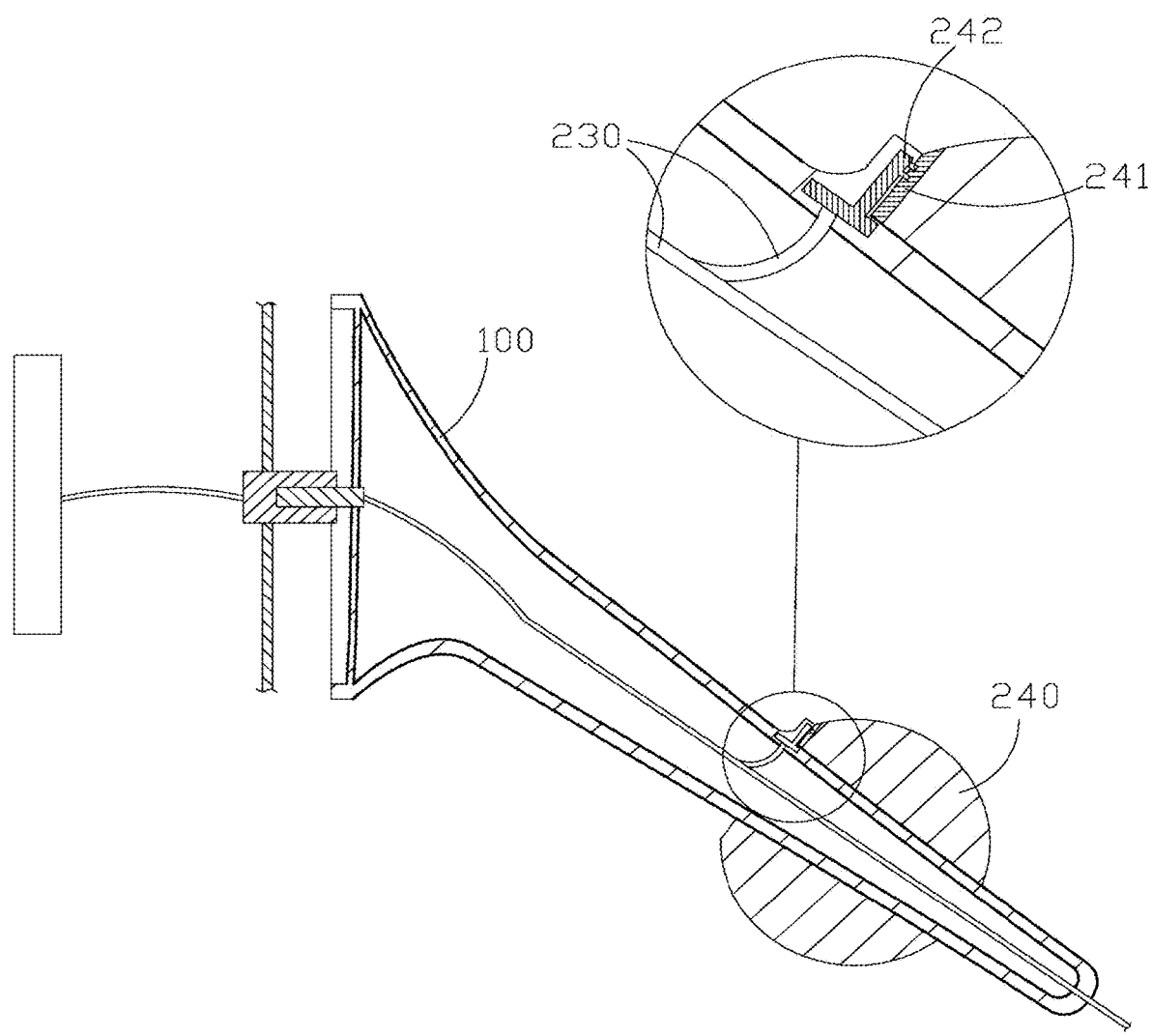
FIG. 13 is a perspective view of the battery contact and the power terminal of the present invention.
Figure 14:
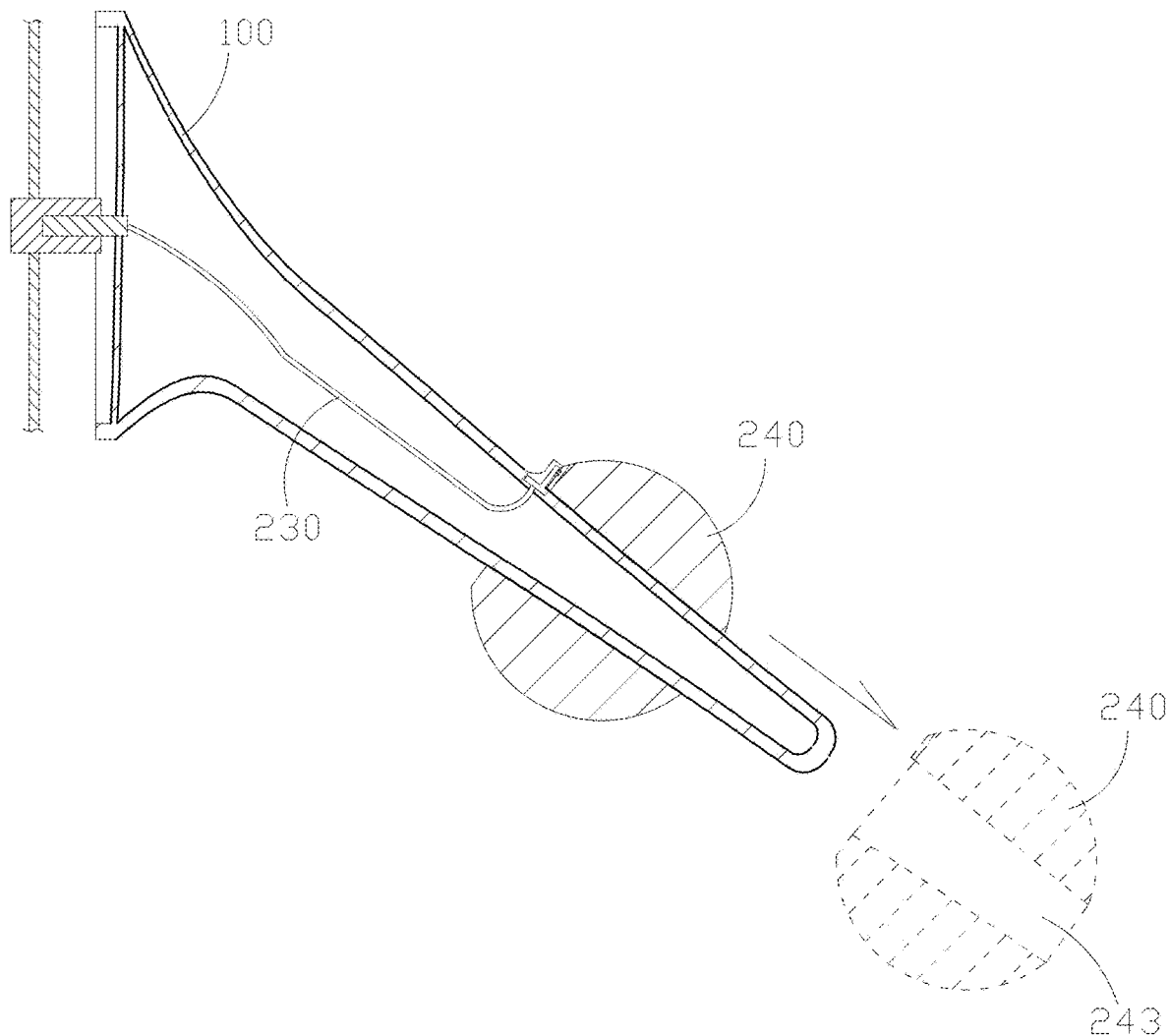
FIG. 14 is a perspective view of the external battery of the present invention.

As shown in FIGS. 12 to 14, in one embodiment, the digital photo frame also comprises a power supply unit (200), wherein the power supply unit (200) comprises a power plug (210), a power socket (220), and a power transmission line (230), wherein the power plug (210) is protruded at the central position of the end face (111) of the movable connection end (110), wherein the power socket (220) is arranged at the central position of the base plate (132) of the movable connector (130), and the power plug (210) and the power socket (220) correspond with each other. When the tilted support stand (100) is connected to the back cover (30), the power plug (210) is simultaneously connected into the power socket (220), so that the power socket (220) is interconnected with either the circuit board or the batteries of the digital photo frame through wires.

One end of the transmission line (230) is interconnected with the power plug (210), while the other end of the transmission line (230) is protruded from the position of the support end (120).

In practice, the end of the transmission line (230) is connected to an external plug, which the external plug is interconnected with an external electric circuit.

As shown in FIGS. 13 and 14, in one embodiment, the power supply unit (200) also comprises an external battery (240), wherein the external battery (240) can be detachably connected to the tilted support stand (100). When the external battery (240) is supplying power, the external battery (240) is connected to the tilted support stand (100), and the external battery (240) provides power to the digital photo frame through the transmission line (230). When the external battery (240) is not needed to supply power, the external battery (240) is detached from the tilted support stand (100).

The external battery (240) is provided with a battery contact (241), and corresponding to the battery contact (241), the tilted support stand (100) is provided with a terminal block (242), wherein the terminal block (242) is interconnected with the transmission line (230). When the external battery (240) is providing power, the battery contact (241) is docked onto the terminal block (242).

In one embodiment, the external battery (240) is provided with a port (243). When the tilted support stand (100) is pierced through the port (243), the external battery (240) functions as a counterweight, allowing the digital photo frame to be steadily mounted onto the supporting surface.

In one embodiment, the external battery (240) has a spherical shape.

As shown in FIG. 14, in one embodiment, one end of the power transmission line (230) is interconnected with the power plug (210), and the other end of the power transmission line (230) is interconnected with the terminal block (242). The power transmission line (230) does not require an external power supply.

What is claimed is:

1. A digital photo frame, comprising: a display monitor (10), a frame body (20), and a back cover (30), wherein said display monitor (10) is arranged at the front surface of said frame body (20), and said back cover (30) is arranged at the rear surface of said frame body (20), wherein said digital photo frame also comprises an ambient light strip (40), wherein said ambient light strip (40) is disposed around said frame body (20), and corresponding to said ambient light strip (40), a translucent cover strip (50) is arranged on said frame body (20), and correspondingly the light emitted by said ambient light strip (40) is projected outward through said translucent strip (50).

2. The digital photo frame recited in claim 1, wherein said light emitted by said ambient light strip (40) forms a lighting rendering area surrounding said digital photo frame, and the color and the light intensity of said light emitted by said ambient light strip (40) can be changed according to the content displayed by said digital photo frame.

3. The digital photo frame recited in claim 1, wherein said ambient light strip (40) comprises a light strip body (41) and a plurality of LED light sources (42), wherein said plurality of LED light sources (42) are simultaneously and electrically connected to said light strip body (41), wherein said translucent cover strip (50) acts as a light diffuser strip, wherein the light emitted by said plurality of LED light sources (42) projects into said light diffuser strip, wherein said light diffuser strip converts the point light source formed by said plurality of LED light sources (42) into an area light source.

4. The digital photo frame recited in claim 3, wherein the back of said frame body (20) is protruded with a rib bracket (21), wherein said ambient light strip (40) has an annular shape, wherein said ambient light strip (40) is entirely surrounding said rib bracket (21), wherein said back cover (30) is fastened to said translucent light strip (50).

5. The digital photo frame recited in claim 3, wherein said digital photo frame also comprises a tilted support stand (100), wherein said tilted support stand (100) is actively connected to said back cover (30), wherein said tilted support stand (100) comprises a movable connection end (110) and a support end (120), wherein the top of said back cover (30) is provided with a movable connector (130), wherein said movable connector (130) and said movable connection end (110) correspond with each other, wherein said movable connection end (110) is detachably connected to said movable connector (130), allowing said tilted support stand (100) to be detachably connected to said back cover (30).

6. The digital photo frame recited in claim 5, wherein said digital photo frame comprises a horizontal bottom edge (61) and a vertical side edge (62), wherein said horizontal bottom edge (61) is positioned at the bottom of said digital photo frame, and said vertical side edge (62) is positioned at one side of said digital photo frame, and when said tilted support stand (100) is connected to said back cover (30), a base support distance (D1) is formed in between of said support end (120) of said tilted support stand (100) and said horizontal bottom edge (61), and a side support distance (D2) is formed in between of said support end (120) of said tilted support stand (100) and said vertical side edge (62), wherein said base support distance (D1) is equivalent to said side support distance (D2), wherein said digital photo frame is able to be arranged on a supporting surface using said tilted support stand (100), said digital photo frame is able to be used in a base support manner and a side support manner, when said digital photo frame is in said base support manner, said digital photo frame is arranged on said supporting surface using said tilted support stand (100), and said support end (120) and said horizontal bottom edge (61) are contacting with said supporting surface, when said digital photo frame is in said side support manner, said digital photo frame is arranged on said supporting surface using said tilted support stand (100), and said support end (120) and said vertical side edge (62) are contacting with said supporting surface.

7. The digital photo frame recited in claim 5, wherein said movable connection end (110) and said support end (120) are respectively located at the two opposing ends of said tilted support stand (100), wherein the whole body of said tilted support stand (100) resembles the shape of a tilted cone.

8. The digital photo frame recited in claim 5, wherein said movable connection end (110) is detachably and rotatably disposed in said movable connector (130), and said end face (111) of said movable connection end (110) is provided with a plurality of locking joints (112) and a positioning piece (113), wherein said plurality of locking joints (112) are protruded around said end face (111), and each of said plurality of locking joints (112) is provided with a top plate (114) and a groove (115), wherein said groove (115) is located in between of said top plate (114) and said end face (111), said movable connector (130) comprises a concave wall (131) and a base plate (132), wherein said base plate (132) is connected to said concave wall (131), and corresponding to said locking joints (112), a plurality of locking plates (133) is provided on said concave wall (131), wherein each said locking plate (133) corresponds to one said locking joint (112), and each said locking plate (133) comprises a guiding plate (134) and a limiting plate (135), wherein said limiting plate (135) is connected to the rear end of said guiding plate (134), said guiding plate (134) and said limiting plate (135) of said locking joint (112) correspond to each other, wherein said base plate (132) is provided with a waist hole (136), wherein said waist hole (136) and said positioning piece (113) correspond with each other, wherein said base plate (132) is also provided with a plurality of deformable segments (137), wherein each said deformable segment (137) corresponds to one said locking joint (112).

9. The digital photo frame recited in claim 5, wherein said digital photo frame also comprises a power supply unit (200), wherein said power supply unit (200) comprises a power plug (210), a power socket (220), and a power transmission line (230), wherein said power plug (210) is protruded at the central position of said end face (111) of said movable connection end (110), and said power socket (220) is arranged at the central position of said base plate (132) of said movable connector (130), said power plug (210) and said power socket (220) correspond with each other, when said tilted support stand (100) is connected to said back cover (30), said power plug (210) is simultaneously connected into said power socket (220).

10. The digital photo frame recited in claim 9, wherein one end of said transmission line (230) is interconnected with said power plug (210), and the other end of said transmission line (230) is protruded from the position of said support end (120).

11. The digital photo frame recited in claim 9, wherein said power supply unit (200) also comprises an external battery (240), wherein said external battery (240) can be detachably connected to said tilted support stand (100), when said external battery (240) is supplying power, said external battery (240) is connected to said tilted support stand (100), and said external battery (240) provides power to said digital photo frame through said transmission line (230).

12. The digital photo frame recited in claim 11, wherein said external battery 240 is provided with a battery contact 241, and corresponding to said battery contact (241), said tilted support stand (100) is provided with a terminal block (242), wherein said terminal block (242) is interconnected with said transmission line (230), when said external battery (240) is providing power, said battery contact (241) is docked onto said terminal block (242).

13. The digital photo frame recited in claim 11, wherein said external battery (240) is provided with a port (243), wherein said tilted support stand (100) is pierced through said port (243).

14. The digital photo frame recited in claim 13, wherein said external battery (240) has a spherical shape.

15. The digital photo frame recited in claim 12, wherein one end of said power transmission line (230) is interconnected with said power plug (210), and the other end of said power transmission line (230) is interconnected with said terminal block (242).

\* \* \* \* \*